United States Patent
Chen

(10) Patent No.: US 7,415,552 B2
(45) Date of Patent: Aug. 19, 2008

(54) KEYBOARD VIDEO MOUSE SWITCH FOR MULTIPLE CHAINING AND THE METHOD THEREOF

(75) Inventor: Sun-Chung Chen, Taipei Hsien (TW)

(73) Assignee: Aten International Co., Ltd, Shijr (TW)

( * ) Notice: Subject to any disclaimer, the term of this patent is extended or adjusted under 35 U.S.C. 154(b) by 516 days.

(21) Appl. No.: 10/824,386

(22) Filed: Apr. 15, 2004

(65) Prior Publication Data

US 2005/0235079 A1   Oct. 20, 2005

(51) Int. Cl.
*G09G 5/00* (2006.01)
*G06F 15/16* (2006.01)
*G06F 15/173* (2006.01)
*G06F 13/38* (2006.01)

(52) U.S. Cl. ............ 710/73; 345/156; 709/236; 709/238; 710/62

(58) Field of Classification Search ............ 710/62, 710/73; 345/156; 709/236, 238
See application file for complete search history.

(56) References Cited

U.S. PATENT DOCUMENTS

| | | | |
|---|---|---|---|
| 5,721,842 A | | 2/1998 | Beasley et al. |
| 6,567,869 B2* | | 5/2003 | Shirley .................. 710/62 |
| 6,671,756 B1* | | 12/2003 | Thomas et al. ............ 710/62 |
| 2002/0143996 A1* | | 10/2002 | Odryna et al. ............ 710/62 |
| 2003/0131127 A1* | | 7/2003 | King et al. ................ 709/238 |
| 2005/0052465 A1* | | 3/2005 | Moore et al. ............ 345/603 |
| 2005/0063108 A1* | | 3/2005 | Voll et al. ................ 361/18 |

FOREIGN PATENT DOCUMENTS

| | | |
|---|---|---|
| JP | 2003163673 | 6/2003 |
| JP | 2003177843 | 6/2003 |
| JP | 2003534685 | 11/2003 |
| WO | 01/84291 | 11/2001 |
| WO | 02080017 | 10/2002 |

OTHER PUBLICATIONS

James F. Kurose and Keith W. Ross; Computer Networking: A Top-Down Approach Featuring The Internet: © 2004; Third Edition; pp. 523-524.*

* cited by examiner

*Primary Examiner*—Tonia L. M. Dollinger
*Assistant Examiner*—Richard Franklin
(74) *Attorney, Agent, or Firm*—Chen Yoshimura LLP

(57) ABSTRACT

When the destinations of local electrical signals are local computers, the local electrical signals are transmitted to the corresponding destination local computers via the keyboard video mouse (KVM) switch directly. When the destinations of the local electrical signals are remote computers, at least one network packet having multiple data sections for correspondingly storing the local electrical signals is generated by the current KVM switch referring to the local electrical signals. A communication is established among a plurality of the KVM switches using a network protocol, for communicating the network packets thereof. At least one remote electrical signal is obtained from another network packet transmitted by another KVM switch, and then is transmitted to the corresponding destination local computer.

18 Claims, 3 Drawing Sheets

KEYBOARD VIDEO MOUSE SWITCH FOR MULTIPLE CHAINING AND THE METHOD THEREOF

BACKGROUND OF THE INVENTION

1. Field of Invention

The invention relates to a computer switching device and, in particular, to a computer switch for multiple chaining and the transmission method thereof.

2. Related Art

With the rapid development in information technology, computers and their peripherals become very popular. Computer users often use the mouse and keyboard to control the computers. Through the monitors or speakers, the computer users can monitor the state of the computers. Sometimes a user may have more than one computer to process different types of things. Traditionally, each computer is equipped with one set of input/output (IO) peripheral devices, including the keyboard, mouse, monitor, and speakers. However, this is a waste of money and space if one has several computers.

On the other hand, large system businesses or enterprise internal networks often involve tens to thousands servers. Each server needs a monitor, a keyboard and a mouse to for management. In practice, one rarely needs to manipulate these devices. Most of the time, the servers do not need to be controlled by the manager. In this situation, it is totally unnecessary, costly, and wasting the space to have a set of IO peripheral devices for each server.

Therefore, a keyboard video mouse (KVM) switch is proposed to use at least one set of operation device to manage several computers. Using the KVM switch does not only solve the cost problem, it simultaneously solves the problems of equipment and space. It may also conquer the compatibility problem among different interfaces.

Currently, most of the single or multiple KVM switches on the market use the CAT5, personal system/2 (PS/2) or universal serial bus (USB) interface for transmissions. Moreover, it is not easy to connect conventional KVM switches together. When several manipulating devices simultaneously access multiple computers, the signal of each operation device has to be sent out in order. Therefore, it is likely to have the signal delay problem, seriously reducing the efficiency of the whole system.

The above-mentioned two drawbacks cause a lot of inconvenience for the users. For large system businesses or the internal networks of mid-size enterprises, in particular, if the KVM switches cannot simultaneously support a large number of manipulating devices and computers, they do not only increase the costs for constructing and maintaining the system but also reduce the communication efficiency of the whole network.

SUMMARY OF THE INVENTION

An objective of the invention is to provide a KVM switch for connecting to multiple KVM switches in order to connect to more manipulating devices and computers. It also solves the signal delay problem.

Another objective of the invention is to provide a computer switching method so that the connected multiple KVM switches can rapidly exchange data, improving the data exchange efficiency and extensibility of the KVM switches.

In accord with the above objectives, the invention provides a KVM switch and the method thereof. It enables several local computers and remote computers to share several local manipulating devices using several KVM switches. Local electrical signals transmitted from the local manipulating devices are first received and then distributed. When the path destination of a local electrical signal is a local computer, it is sent to the local computer. If the path destination of a local electrical signal is a remote computer, at least one network packet with several data sections for correspondingly storing the local electrical signals is generated according to the local electrical signal.

A communication is established among the KVM switches using a network protocol, for transmitting the network packets to some other KVM switch that the remote computers connect to and for receiving the network packets transmitted from another KVM switch. At least one remote electrical signal is obtained from another network packet transmitted by another KVM switch, and then is transmitted to the corresponding destination local computer.

The disclosed KVM switch contains at least several first interfaces, several second interfaces, a packet encoding device, a network device, a packet decoding device, and switch device. The first interfaces connect to the local manipulating devices to receive the local electrical signals from the connected local manipulating devices. The second interfaces connect to the local computers. The packet encoding device generates at least a network packet with several data sections correspondingly storing the local electrical signals received from the first interfaces according to the local electrical signals.

The network device communicates with the network device of another type of KVM switches using a network protocol in order to send out network packets and to receive network packets from another type of KVM switches. The packet decoding device decodes the network packet sent from another type of KVM switches to obtain at least one remote electrical signal. The switch device distributes the local and remote electrical signals to the second interfaces or the packet encoding device according to path selection setting.

According to the preferred embodiment of the invention, each of the local electrical signals contains a keyboard signal and a mouse signal. The network packet further has a network overhead section. When the path destinations of the local electrical signals are the remote computers connected to a same remote KVM switch, the local electrical signals are encoded inside the same network packet.

The network device contains a network interface chip and a network switch. The network interface chip connects to the packet encoding device and the packet decoding device. The network switch has a first port, a second port, and a third port. The first port connects to the network interface chip. One of the second and third ports connects to another type of KVM switch. Moreover, the network device further contains a 2-way switch connecting to the second port, for switching to the Ethernet or another type of KVM switch.

The switch device contains a central processing unit (CPU). The first interfaces contain several universal asynchronous receivers/transmitters (UART's) and a half-duplex communication processor. The second interfaces also contain several UART's. The packet encoding device and the packet decoding device contain individual CPU's or share the same CPU for packet encoding/decoding.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

Figure 1:
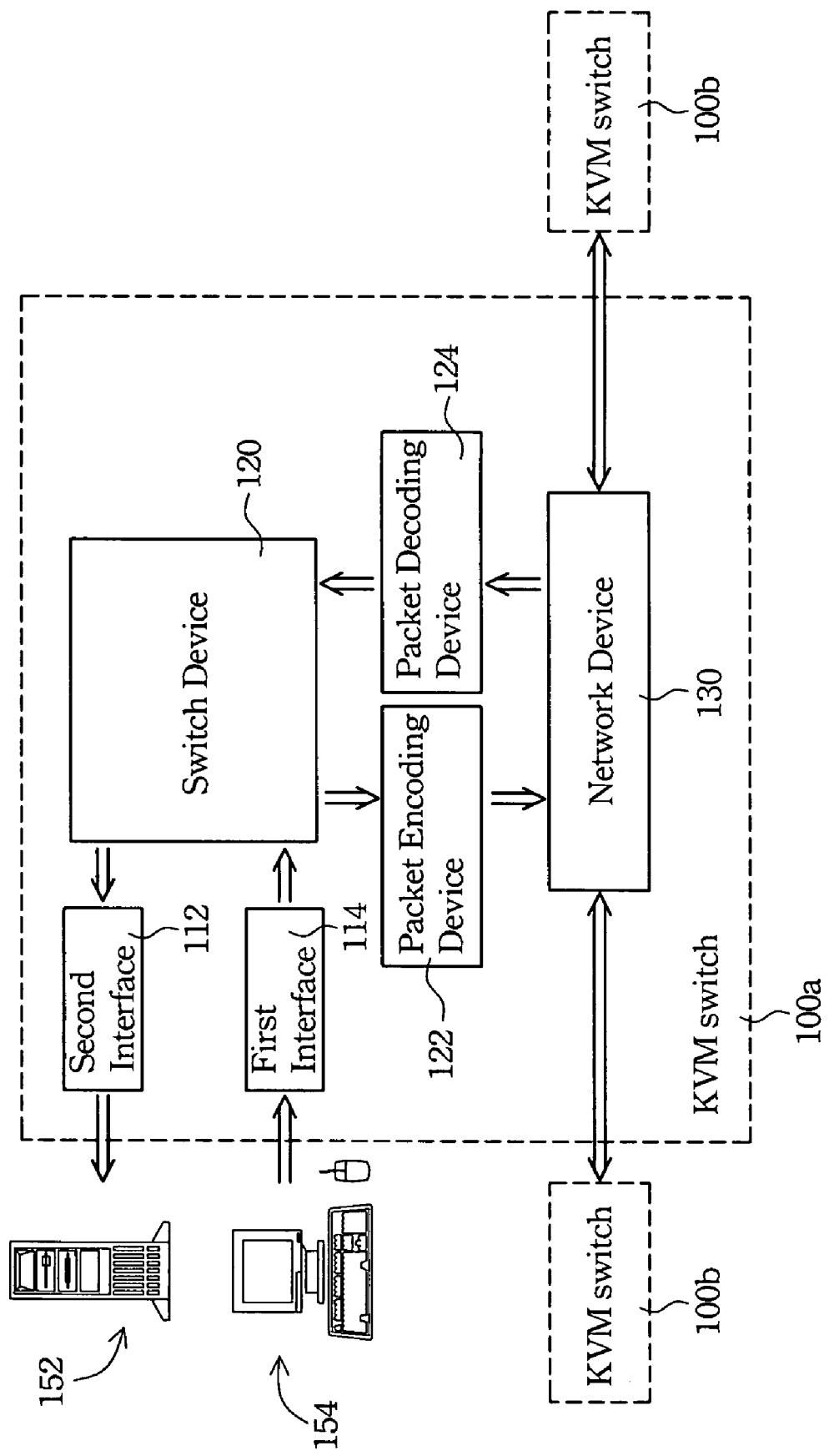
FIG. 1 is a schematic view of a preferred embodiment of the invention.

In the schematic view of a preferred embodiment shown in FIG. 1, the keyboard video mouse (KVM) switch 100a use several second interfaces 112, such as the universal serial bus (USB) interface, the serial port (COM) interface, or personal system/2 (PS/2) interface, to connect several local computers 152. It further uses several first interfaces 114, such as the USB, COM, or PS/2 interfaces, to connect to several local manipulating devices 154, such as the keyboard and mouse. In order to clearly explain this embodiment, we use only one first interface 114 and one second interface 112 in FIG. 1 for demonstration purposes.

According to a path selection setting, when the path destination of the local electrical signal is a local computer 152, the switch device 120 (e.g. a switch chip, programmable chip, or CPU) sends the local electrical signal to the second interface 112 of the destination. When the path destination of the local electrical signal is a remote computer, such as one that connects to another KVM switch 100b, the switch device 120 sends the local electrical signal to the packet encoding device 122.

The packet encoding device 122, such as a programmable chip or CPU, generates at least one network packet with several data sections correspondingly storing the local electrical signals received by the first interfaces 114.

Through a network protocol, such as the Ethernet or wireless protocol, the network device 130 establishes communications with the network devices of other KVM switches 100b in order to transmit the network packets generated by the packet encoding device 122 and to receive those transmitted from another KVM switch 100b. The packet decoding device 124, such as a programmable chip or CPU, then decodes to obtain at least one remote electrical signal from the network packet transmitted from the other KVM switch 100b. The switch device 120 distributes the remote electrical signal according to the path selection setting to the second interface 112 of the destination, reaching the local computer 152 of the destination.

Figure 2:
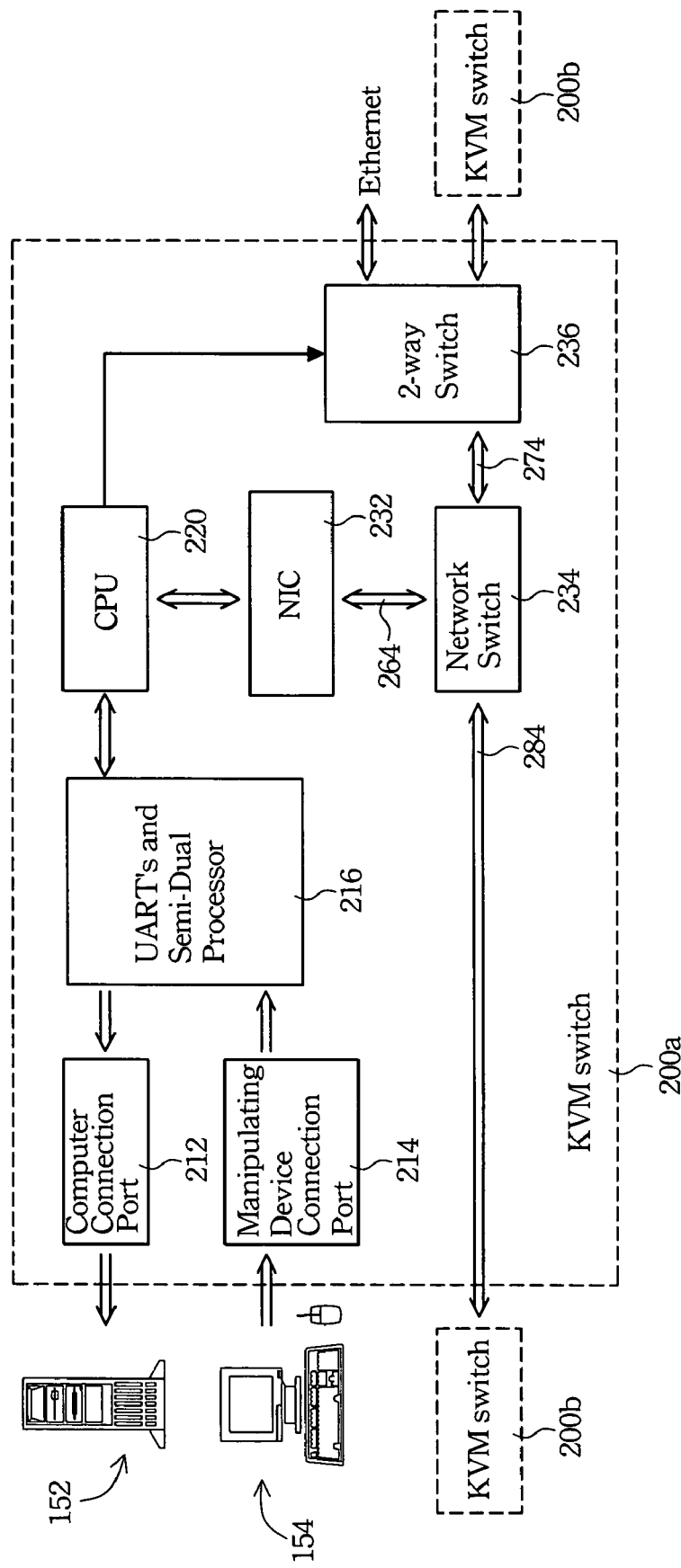
FIG. 2 is a schematic view of the preferred embodiment shown in FIG. 1 implemented in practice.

FIG. 2 is a schematic view of the embodiment in FIG. 1 implemented in reality. Several second interfaces 112 connect to several local computers 152 via several computer connection ports 212. The several first interfaces 114 connect to several local manipulating devices 154 using several operation device connection ports 214. In order to clearly explain this embodiment, we use only one operation device connection port 214 and one computer connection port 212 in FIG. 2 for demonstration purposes.

The electrical signals between the local computer 152 and the KVM switch 200a are transmitted using the universal asynchronous receivers/transmitters (UART) and the half-duplex communication processor 216. The electrical signals between the local operation device 154 and the KVM switch 200a are also transmitted using the same set of UART and half-duplex communication processor 216. Under the compatibility consideration of signal communications, the electrical signals can first converted into a data packet in another embodiment of the invention. This can enhance the compatibility of signal communications among different interfaces of the switches.

In an embodiment of the invention, the KVM switch 200a can simultaneously connect to 32 local computers 152 and 4 local manipulating devices 154. In other words, the KVM switch 200a has 32 computer connection ports 212 and four operation device connection ports 214. Therefore, it needs to be configured with four 9-port UART's and a half-duplex communication processor for electrical signal transmissions. The half-duplex communication processor can be replaced with a slightly more expensive full-duplex communication processor or other more suitable processor.

The switch device 120 utilizes a CPU 220 to arrange the paths of local and remote electrical signals according to path selection setting saved in a storage medium, such as a routing table. When the path destinations of the electrical signals are local computers 152, the CPU 220 transmits the electrical signals via the UART and half-duplex communication processor 216 to the computer connection ports 212 of the destinations and then to the local computers 152 of the destinations.

When the path destinations of the electrical signals are remote computers, the CPU 220 performs packet encoding to generate at least one network packet with several data sections correspondingly storing the electrical signals received by the operation device connection ports 214 according to the electrical signals. Afterwards, the network packet is transmitted to the network device 130.

The network device 130 contains a network interface chip (NIC) 232 and a network switch 234 for transmitting network packets produced by the CPU 220 and receiving those transmitted by another KVM switch 200b. The network switch 234 has a first port 264, a second port 274, and a third port 284. The first port 264 connects to the NIC 232. The second port 274 and the third port 284 can connect to another KVM switch 200b.

Moreover, in the preferred embodiment of the invention, the network device 130 further contains a 2-way switch 236 connecting to the second port 274 for making switches between the Ethernet and another KVM switch 200b. The 2-way switch 236 is controlled by the CPU 220. When the 2-way switch 236 switches to the Ethernet, the KVM switch 200a can be upgraded by downloading firmware from the Ethernet. A remote manager may also directly manage and monitor the KVM switch 200a and keep track of its operation record via the Ethernet.

In the preferred embodiment, the KVM switch is set in such a way that when it is connected with several KVM switches, the 2-way switch of the first KVM switch is connected to the Ethernet while others connected with one another. The firmware downloaded via the first KVM switch is forwarded to other KVM switches. The transmissions and reception of the network packets are performed following the Ethernet protocol. However, people skilled in the art can use other settings or network protocols without departing from the spirit and scope of the invention.

After the network switch 234 receives a network packet from another KVM switch 200b, the NIC 232 transfers the network packet to the CPU 220. The CPU 220 obtains from the network packet at least one remote electrical signal whose path destination is a local computer 152. Therefore, the CPU 220 transmits the remote electrical signal to the computer connection port 212 of the destination and to the local computer 152 of the destination according to the path selection setting.

Besides, the functions of the switch device 120, the packet encoding device 122, and the packet decoding device 124 in the preferred embodiment are implemented using the same CPU 220. Thus, the devices in the current embodiment are not necessarily implemented independently. That is, these devices can share one or several programmable chips or CPU's using an appropriate program.

Figure 3:
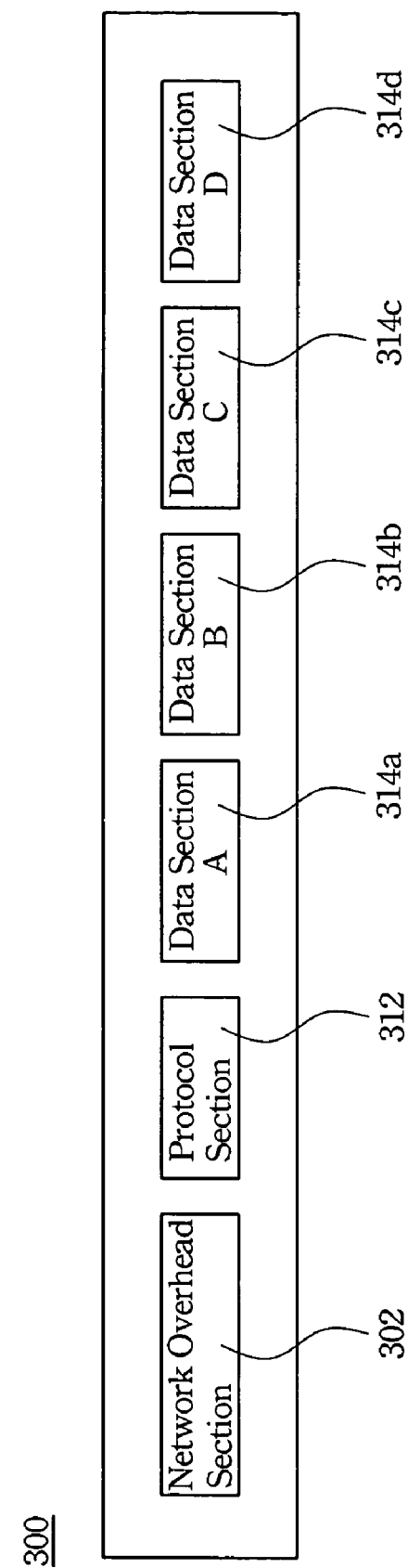
FIG. 3 is a schematic view of the network packet in the preferred embodiment shown in FIG. 2.

FIG. 3 is a schematic view of the network packet in FIG. 2. Since the KVM switch 200a can simultaneously connect to four local manipulating devices 154, the network packet 300 has four data sections 314a, 314b, 314c, 314d correspondingly storing the electrical signals received by the operation device connection ports 214.

Moreover, the network packet 300 further contains a network overhead section 302 and a protocol section 312. Under the Ethernet protocol used herein, the network overhead section 302 stores the Ethernet overhead, such as the NIC address. The protocol section 312 stores the protocol codes, defining the packet protocol of the network packet 300.

In the preferred embodiment, when two or more local manipulating devices 154 access remote computers that connect to the same other KVM switch 200b, the electrical signals of the local manipulating devices 154 are encoded and stored in the same network packet. The electrical signals from two or more different local manipulating devices 154 are transmitted using the same network packet such that no signal delay occurs to the remote computers connecting to the same other KVM switch 200b.

The KVM switch in the current embodiment uses its network device to connect to others in order to communicate with more manipulating devices and computers. The network device can include cheap NIC's and network switches, connecting to the network devices of other KVM switches using a technically mature and unified network protocol. In addition to lowering the design and production costs, the KVM switch can more easily and directly connect to the external network environment, facilitating firmware upgrades. It further enables managers to directly manage and monitor the KVM switch or keep track of its operation record via the network.

Furthermore, the preferred embodiment uses a network packet to transmit electrical signals of remote computers with path destinations being connected to the same KVM switch. This prevents the problem of signal delay as in the prior art due to sorting and waiting. This enables multiple KVM switches connected together to rapidly exchange data, increasing the efficiency and extensibility of the KVM switches.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A keyboard video mouse (KVM) switch for a plurality of local and remote computers to share a plurality of local manipulating devices, the KVM switch comprising:
   a plurality of first interfaces adapted for connecting to the local manipulating devices to receive a plurality of local electrical signals, wherein local electrical signals from different first interfaces are for manipulating different local or remote computers;
   a plurality of second interfaces adapted for connecting to the local computers;
   a packet encoding device, which generates at least one network packet having a plurality of data sections, at least some data sections of a same network packet corresponding to the local electrical signals received by different ones of the first interfaces destined for different remote computers;
   a network device adapted for communicating with a network device of another KVM switch using a network protocol in order to transmit the network packet and to receive a network packet transmitted from said another KVM switch;
   a packet decoding device adapted for obtaining at least one remote electrical signal from the network packet of said another KVM switch; and
   a switch device adapted for transmitting the local and remote electrical signals to the second interfaces and the packet encoding device according to a path selection setting.

2. The KVM switch of claim 1, wherein the network packet generated by the packet encoding device has a network overhead section.

3. The KVM switch of claim 1, wherein each of the local electrical signals contains a keyboard signal and a mouse signal.

4. The KVM switch of claim 1, wherein the network device of the KVM switch contains:
   a network interface chip (NIC), which connects to the packet encoding device and the packet decoding device; and
   a network switch, which has a first port, a second port, and a third port; wherein the first port connects to the NIC, and one of the second port and the third port connects to said another KVM switch.

5. The KVM switch of claim 4, wherein the network device of the KVM switch contains a 2-way switch connecting to the second port for switching between an Ethernet and said another KVM switch.

6. The KVM switch of claim 1, wherein the first interfaces contain a plurality of universal asynchronous receivers/transmitters (UART's) and a half-duplex communication processor.

7. The KVM switch of claim 1, wherein the second interfaces contain a plurality of UART's and a half-duplex communication processor.

8. The KVM switch of claim 1, wherein the packet encoding device contains a central processing unit (CPU).

9. The KVM switch of claim 1, wherein the packet decoding device contains a CPU.

10. The KVM switch of claim 1, wherein the switch device contains a CPU.

11. A computer switching method for a plurality of local and remote computers to share a plurality of local manipulating devices, the method comprising the steps of:
   receiving a plurality of local electrical signals transmitted from the plurality of local manipulating devices, wherein local electrical signals from different local manipulating devices are for manipulating different local or remote computers;
   distributing the local electrical signals in such a way that when path destinations of the local electrical signals are the local computers, the local electrical signals are transmitted to the local computers while when the path destinations of the local electrical signals are the remote computers, at least one network packet having a plurality of data sections is generated, at least some data sections of a same network packet corresponding to the local electrical signals received from different ones of the plurality of local manipulating devices destined for different remote computers;

establishing communications among KVM switches using a network protocol in order to transmit the network packet to other KVM switches connected to the remote computers and to receive a network packet transmitted from another KVM switch;

obtaining at least one remote electrical signal from the network packet transmitted from said another KVM switch; and transmitting the remote electrical signals to the local computers of their destinations.

12. The method of claim 11, wherein the network packet transmitted to other KVM switches has a network overhead section.

13. The method of claim 11, wherein each of the local electrical signals contains a keyboard signal and a mouse signal.

14. The method of claim 11, wherein the local electrical signals are encoded in a same network packet when the path destinations of the local electrical signals are the remote computers connected to a same KVM switch.

15. The method of claim 11, wherein the communication among the KVM switches is achieved using a network interface chip (NIC) and a network switch configured for each KVM switch.

16. The method of claim 11, wherein the local electrical signals are received using a plurality of UART's and a half-duplex communication processor.

17. The method of claim 11, wherein the network packet transmitted to other KVM switches uses a CPU to perform encoding and decoding.

18. The method of claim 11, wherein the paths of the local and remote electrical signals are switched by a CPU according to a path selection setting.

* * * * *